United States Patent [19]

Patel

[11] 4,219,819

[45] Aug. 26, 1980

[54] SAFETY DEVICES

[76] Inventor: Rasik M. Patel, 60 Sunnymead Rd., Kingsbury, London NW9 8BX, England

[21] Appl. No.: 950,437

[22] Filed: Oct. 11, 1978

[51] Int. Cl.[2] .......................... H01Q 1/28; B64B 1/52

[52] U.S. Cl. .......................... 343/18 B; 116/DIG. 8; 116/DIG. 9; 116/210; 455/114; 343/706

[58] Field of Search .................. 116/DIG. 8, DIG. 9, 116/210; 325/112, 116, 118; 343/706, 18 B

[56] References Cited

U.S. PATENT DOCUMENTS

| | | | |
|---|---|---|---|
| 2,923,917 | 2/1960 | McPherson | 116/210 |
| 3,273,153 | 9/1966 | Icenbice | 343/706 |
| 3,715,668 | 2/1973 | Herring | 325/112 |
| 3,727,229 | 4/1973 | Clinger | 325/112 |
| 3,938,466 | 2/1976 | Crissman | 116/DIG. 9 |
| 4,042,882 | 10/1976 | Camacho | 116/210 |

*Primary Examiner*—Gerald Goldberg
*Assistant Examiner*—Denis E. Corr
*Attorney, Agent, or Firm*—Brisebois & Kruger

[57] ABSTRACT

A device for aiding in the location of a person or object comprises a balloon connected by a valve to a container for a pressurized gas lighter than air, all of which are disposed within a casing in which a tethering line for the balloon is disposed and held closed by a releasable strap and lid which also holds the valve closed and which is operative to permit escape of the balloon and gas container from the casing whilst simultaneously opening the valve to admit gas into the balloon whereby the inflated balloon with the gas container connected thereto can rise into the air at one end of the tethering line.

9 Claims, 2 Drawing Figures

SAFETY DEVICES

Figure 1:
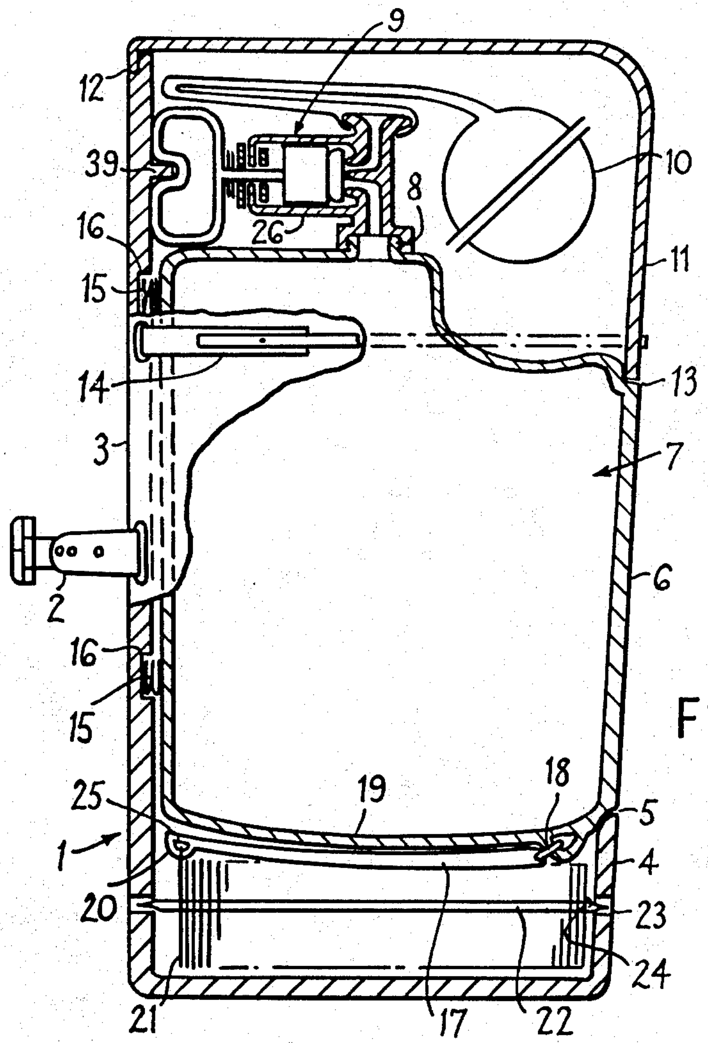

This invention relates generally to safety devices and has for an object the saving of life, for example from exposure and drowning at sea, from exposure and starvation on land or from fire.

A person lost overboard at sea or a lifeboat launched from a ship cannot easily be located or detected visually or by radar equipment in current use from searching aircraft or vessels due to its closeness to the surface of the water. Again, a person lost in the mountains or in thick forest, cannot easily be located by rescuers even if equipped with a radio transmitter due to the obstruction to reception of the signals by the surrounding mountains and forest.

More particularly, therefore, the invention has for one of its objects locating of a person or object more particularly with a view to aiding in the rescue of a person lost at sea or on land.

To this end, and from one aspect, the invention consists in a device for aiding in the location of a person or object, comprising a balloon connected by a valve to a container for a pressurised gas lighter than air, said balloon, container and valve being disposed in an openable casing which is held closed by releasable means and which is adapted to be attached to the person or object, and a tethering line for said balloon disposed in said casing, said valve being held in a closed position by the releasable means, whereby upon operation of the releasable means, the casing is opened to permit escape of the balloon and gas container therefrom and the valve is opened to release the gas into the balloon and the inflated balloon with the gas container connected thereto can rise into the air to a height determined by the length of the tethering line to give an indication of the position of the person or object.

Thus, the device according to the invention can assist rescuers for example on a searching vessel or aircraft in locating the person or other object for whom they are searching. The indication may be visual to which end the balloon may be brightly coloured and/or in the form of infrared radiation to be detected by an infra-red camera. Alternatively or in addition the indication may comprise radio and/or radar signals emitted from a radio transmitter or reflected from a radar reflector respectively forming part of the device. Desirably, the infra-red radiation will be that emitted from the balloon itself although the use of a small source of heat comprising part of the device is not precluded. Accordingly, it is possible for the inflated balloon and therefore the position of the person or other object to be located during the day or night whatever the weather conditions.

The size of the device is dependent upon whether the device is adapted for use in connection with a person or object: for example in the case of a person, the device is conveniently manufactured in the form of a kit or pack which may be attached to the person at any convenient location by any suitable means such as a strap. In a preferred application the device is of a size suitable for attachment to a person's wrist. On the other hand if the object is a water-bourne vessel, air-craft or land vehicle, the device and thus the balloon may be of correspondingly greater size the more readily assisting in location. In such cases the device may be bolted, screwed or otherwise attached to the object. The height to which the inflated balloon can rise is dependent on the length of the tethering line and thus to a certain extent on the size of the device. The inflated container should rise at least 600 feet above the person or object to be high enough to be detected e.g. by radar but with ships, heights of up to 2,000 feet are envisaged. Conveniently, the tethering line is wound on a reel in the casing and is attached to the gas container which rises with the inflated balloon as the line unreels.

The releasable means for opening the casing may be automatically operable in response to an external stimulus such as contact with water, snow, fire or excessive heat or impact e.g. a fall or crash. Alternatively the opening means are manually operable or additionally manually operable to provide for opening in the event of failure of the casing to open automatically. The automatic opening means may be a water soluble, cold, heat, or impact sensitive latch. The manual opening means may be a press-stud, hook-and-pile, or tear-strip type fastening. To ensure that the inflating container and gas container leave the casing rapidly and with ease, preferably, means are provided for ejecting the gas container from the casing upon opening of the casing. For rapid inflation of the inflatable container, the valve is advantageously operable by the gas pressure, optionally with the assistance of resilient means, when the casing is opened by the releasable means. Preferably, to ensure valve opening when there is some misfunction of the valve, some form of manual means is provided for opening the valve.

Figure 2:
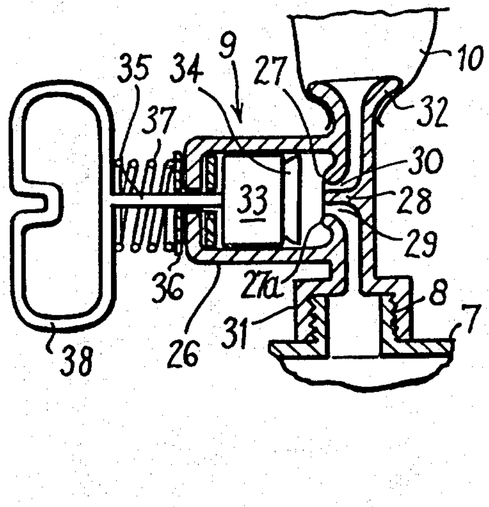

In order that the invention may be more readily understood, an embodiment thereof will now be described, by way of example, with reference to the accompanying drawings, in which:

FIG. 1 is a part longitudinal cross-section of a rescue aid device constructed in accordance with the invention, and FIG. 2 is an enlarged scrap view of FIG. 1.

The rescue aid device comprises a casing 1 of generally rectangular shape and having a strap 2 secured to one of its side walls 3 for attaching the casing to, for example the wrist of a person. The opposite wall 4 of the casing 1 has a vertical slot 5 therein which is closed by a wall portion 6 of a tank or can 7 containing pressurised helium. The outlet 8 of the can 7 is connected by interengaging screw-threads to a valve 9 for admitting a flow of pressurised helium gas from the can 6 and into a balloon 10 also connected to the valve 9. The casing has a lid 11 which engages one end of the side wall 3 in the manner indicated at 12 and the wall 6 of the tank 7 in the manner indicated at 13, closing the open top of the slot 5, so that a strap 14 encircling the casing 1 and extending around the side wall 3 and part of the lid adjacent 13 secures the lid 11 to the body of the casing and holds the can 7 within the casing.

Compression springs 15 secured in recesses 16 in the casing wall 15 are held in compression by engagement with the can 7. A radar reflector 17 is loosely hinged at 18 and lies adjacent to a wall 19 of the can, and has secured at a location 20 opposite the hinge 18, one end of a line 21 of string or wire. The line is reeled onto a spindle 22 which is rotatable in apertures or recesses 23 in the walls 3 and 4 of the casing. The other end of the line 21 is secured to the spindle 22 where indicated at 24. Attached to the radar reflector 17 is a radio transmitter 25 powered by one or more dry-celled batteries (not shown), which transmitter is operative to emit intermittent radio signals upon release of the can 7 from the casing in a manner to be described. For example, a micro-switch (not shown) connected into the radio transmitting circuit may be arranged to be actuated by the movement of the hinge 18 when the can is released.

The valve 9 comprises a valve body 26 having walls 27, 27*a* defining an aperture which is partitioned by a partition 28 into inlet and outlet passages 29 and 30. The passage 29 communicates with the interior of the gas can 7 via a screw-threaded inlet portion 31 of the valve body whereas the outlet passage 30 communicates via a flared outlet 32 with the balloon 10, the flared outlet ensuring that the balloon is securely held to the valve body 26. The free ends of the partition 28 and walls 27 and 27*a* lie in the same plane and together form a seating for a movable valve member 33 which is slidable within the valve body. Preferably, as shown, the movable valve member 33 has a pad 34 of elastomeric or other suitable material which engages with the seating to form a fluid-tight seal when compressed there against.

The valve member 33 has a rod 35 projecting through an aperture in the valve body, which aperture is conveniently sealed as by sealing washers 36. Alternatively, or in addition, a gland seal may be mounted in a groove in the periphery of the member 33 or the pad 34 may engage sealingly with the inner wall of the valve chamber. A compression spring 37 acting between the valve body and a handle 38 secured to the rod 35 acts to urge the valve member into the open position shown in FIG. 2 in which the inlet passage 29 is placed in communication with the outlet passage 30. Instead of the spring 37 being mounted as shown it could be mounted within the chamber of the valve body and act between the valve body and member 33. The valve member 33 is held in the closed position illustrated in FIG. 1 by a latching projection 39 which engages with the handle 38.

The rescue aid kit (RAK) described can be used, and operates, in the following manner.

Where the casing is small, the strap 2 is used to attach it to the wrist of a person likely, for example to be lost at sea or, alternatively, the larger kit may be attached by means other than the strap 2 to e.g. a ship or e.g. form part of a life jacket. On being washed overboard, the strap 14 may be released manually by the person or automatically where the strap 14 is of the kind which releases on contact with water (i.e. a water-soluble strap): the latter kind of strap is of particular use when the person is temporarily knocked unconscious on being washed overboard. The lid 11 is no longer attached to the casing and the springs 15 urge the can 7 through the slot pushing the lid 11 away and the valve 9 is opened by the gas pressure, assisted by the spring when the handle 38 disengages the projection 39, automatically. In the unlikely eventuality of the valve member sticking, the handle 38 can be used to open the valve manually. Opening of the valve places the inlet and outlet passages 29 and 30 in communication and pressurised helium gas quickly flows from the can 7 and inflates the balloon such that the can 7 rises above the surface of the water unreeling the line 21 to an extent, which can vary from about 600 feet upwards, determined by the length of the line. As the can rises with the ballon the radar reflector unhinges into a position where radar waves can be reflected, the movement of the hinge 18 connecting the radio transmitter 25 in the battery circuit so that the transmitter emits intermittent radio signals.

It will be readily apparent from the description that the location of the lost person or object is greatly facilitated by the device described.

Various modifications may be made without departing from the scope of the invention as defined in the appended claims.

For example, the inlet and outlet passages may be arranged one inside the other, preferably coaxially. In another modification, the entire valve member may be held in within the valve body in the closed position by a rupturable member e.g. of metal foil sealed to the valve body in which case handle 38 and part of rod 35 would be omitted.

In a further modification the gas can is completely enclosed within the casing of which the open top is closed by a lid held on the casing by means of a releasable latching means which is appropriate to the desired use. The handle 38 is arranged such that it engages a projection 39 on the undersurface of the lid, and ejecting means such as springs 15 are arranged to act on the gas can or radar reflector to eject the gas can and balloon from the casing. In this modification the casing can be made in a variety of shapes e.g. of generally cylindrical or rectangular shape.

It will be appreciated that the various parts of the device are made from or treated with materials that resist corrosion and attack by water. Desirably also the casing itself is water proof by the use of suitable sealing material.

Testing facilities may be provided for ascertaining the pressure of the gas e.g. by a suitable valved inlet in the gas can, battery charge, integrity of the balloon fabric etc., after the elapse of a certain period of non-use of the device.

If a heat source is necessary or desirable for position location by infra-red cameras, the radio-transmitter batteries may be connected to a suitable heating element or a separate battery/circuit may be provided, operable by a suitable microswitch, e.g. on ejection of the gas container.

Where possible, the line could be a few thousand feet in length.

Moreover, the line could be made of such material that it can act as a transmitting and/or receiving aerial.

I claim:

1. A device for aiding in the location of a person or object, comprising a balloon, a container for a pressurised gas lighter than air, a normally-closed valve connecting said balloon to said container, a casing in which said balloon, said container and said valve are disposed, means carried by said casing, for use in attaching the casing to the person or object, releasable means mounted externally on said casing and holding both said casing and said valve closed, means in said casing, for ejecting said gas container from said casing, said ejecting means comprising resilient means interposed between a wall of said casing and an oppositely facing wall portion of said gas container, and a tethering line for said balloon disposed within said casing, whereby upon operation of the releasable means, the casing is opened to permit escape of the balloon and gas container therefrom, the valve is opened to release the gas into the balloon and the gas container is urged away from said casing and the inflated balloon with the gas container connected thereto can rise into the air to a height determined by the length of the tethering line to give an indication of the position of the person or object.

2. A device as claimed in claim 1, including at least one of a radar reflector and radio transmitter connected to said balloon, said radar reflector being hinged to said gas container and lying adjacent a wall thereof, and said radio transmitter being carried by said radar reflector, whereby when the balloon and gas container escape from said casing the radar reflector hinges away from said adjacent wall of said gas container.

3. A device for aiding in the location of a person or object, comprising:

(a) a balloon,
(b) a container for a pressurised gas lighter than air,
(c) a normally-closed valve connecting said balloon to said container,
(d) an openable casing in which said balloon, said container and said valve are disposed, said casing having a lid which normally closes the casing,
(e) means carried by said casing, for use in attaching the casing to the person or object,
(f) a single quickly-actuable releasable means mounted externally on said casing, said releasable means releasably securing said lid to said casing and holding both said casing and said valve closed,
(g) said container being defined by its own wall means, and at least a part of an external wall of the casing being formed by a portion of said container wall means,
(h) means for ejecting said gas container from said casing, said container being held in said casing by the lid engaging said part of the wall of the casing and against the action of said ejecting means, and
(i) a tethering line for said balloon disposed within said casing, whereby upon operation of the releasable means, the lid is released to open the casing to permit escape of the balloon and gas container therefrom and the gas container is urged away from the rest of the casing and simultaneously the valve is opened to release the gas into the balloon and the inflated balloon with the gas container connected thereto can rise into the air to a height determined by the length of the tethering line to give an indication of the position of the person or object.

4. A device as claimed in claim 3, wherein the releasable means is operable automatically in response to an external stimulus.

5. A device as claimed in claim 3, wherein the valve is opened at least mainly by the gas pressure upon operation of the releasable means.

6. A device as claimed in claim 5, wherein the valve comprises a valve body defining a valve chamber having a valve inlet and a valve outlet and a movable valve member disposed in said chamber and held by said releasable means in a position in which said valve inlet and valve outlet are closed, said valve member being moved, upon operation of the releasable means, by the gas pressure into a position in which said valve inlet and valve outlet are placed in communication.

7. A device as claimed in claim 6, wherein the valve inlet and valve outlet are defined by respective walls and a partition between the walls, the partition and walls defining a seating for said valve member.

8. A device as claimed in claim 6, wherein said valve member has a rod which projects from said chamber and which carries, outside said chamber but inside said casing, a handle member which has means defining a recess therein, a projection on said casing and engaging in said recess for holding said valve member in said position in which said valve inlet and valve outlet are closed, wherein resilient means acts on said valve member to assist in opening said valve, wherein said tethering line is made of a material enabling it to act as an aerial and wherein a reel carrying said tethering line is mounted in and attached to said casing beneath said container whereby after escape of the balloon and container from said casing the reel unwinds as the inflated balloon connected to the tethering line rises.

9. A device as claimed in claim 3, including at least one of a radar reflector and radio transmitter connected to said balloon, said radar reflector being hinged to said gas container and lying adjacent a wall thereof, and said radio transmitter being carried by said radar reflector, whereby when the balloon and gas container escape from said casing the radar reflector hinges away from said adjacent wall of said gas container.

* * * * *